US009361701B2

(12) United States Patent
Tizhoosh et al.

(10) Patent No.: US 9,361,701 B2
(45) Date of Patent: Jun. 7, 2016

(54) METHOD AND SYSTEM FOR BINARY AND QUASI-BINARY ATLAS-BASED AUTO-CONTOURING OF VOLUME SETS IN MEDICAL IMAGES

(76) Inventors: Hamid Reza Tizhoosh, Aurora (CA); Farzad Khalvati, Richmond Hill (CA)

(*) Notice: Subject to any disclaimer, the term of this patent is extended or adjusted under 35 U.S.C. 154(b) by 50 days.

(21) Appl. No.: 14/110,529

(22) PCT Filed: Apr. 13, 2012

(86) PCT No.: PCT/CA2012/000353
§ 371 (c)(1),
(2), (4) Date: Jan. 24, 2014

(87) PCT Pub. No.: WO2012/139205
PCT Pub. Date: Oct. 18, 2012

(65) Prior Publication Data
US 2014/0161329 A1    Jun. 12, 2014

Related U.S. Application Data

(60) Provisional application No. 61/474,988, filed on Apr. 13, 2011.

(51) Int. Cl.
*G06T 7/00* (2006.01)

(52) U.S. Cl.
CPC ............ *G06T 7/0081* (2013.01); *G06T 7/0083* (2013.01); *G06T 7/0089* (2013.01); *G06T 2207/20128* (2013.01); *G06T 2207/20148* (2013.01)

(58) Field of Classification Search
None
See application file for complete search history.

(56) References Cited

U.S. PATENT DOCUMENTS

| | | |
|---|---|---|
| 6,901,156 B2 | 5/2005 | Giger et al. |
| 6,950,544 B2 | 9/2005 | Ashton |
| 7,245,766 B2 | 7/2007 | Brown et al. |
| 7,324,842 B2 | 1/2008 | Dale et al. |
| 7,327,138 B2 | 2/2008 | Krieg et al. |
| 7,333,644 B2 | 2/2008 | Jerebko et al. |
| 7,340,082 B2 | 3/2008 | Janssen et al. |

(Continued)

OTHER PUBLICATIONS

Park et al. "Construction of an Abdominal Probabilistic Atlas and its Application in Segmentation." IEEE Transactions on Medical Imaging, vol. 22, No. 4, Apr. 2003, pp. 483-492.*

(Continued)

*Primary Examiner* — Jon Chang
(74) *Attorney, Agent, or Firm* — Norton Rose Fulbright Canada LLP; Maya Medeiros

(57) ABSTRACT

The present invention is a set of algorithms or calculations that may be applied to efficiently use atlas-based segmentation using QBinary (binary and/or quasi-binary) representations of images and/or their ROIs. A QBinary representation of an image or a part of an image (for example, such as a ROD may be a binary image (for example, such as a code with 1 bit) and or a quasi-binary image (for example, such as a code with more than 1 and less than 8 bits) that serves to represent that image and/or ROI in an atlas. Two-dimensional QBinary codes may be used to both construct QBinary atlases and QBinary-controlled atlases with or without QB-Codes registration. Additionally, the present invention may offer a set of algorithms to sequentially auto-contour (or auto-segment) individual slices of a volume set of digital images without or without QB-Codes registration, provided one slice is semi-automatically contoured by a human operator.

16 Claims, 13 Drawing Sheets

(56) References Cited

U.S. PATENT DOCUMENTS

| | | |
|---|---|---|
| 7,346,201 B2 | 3/2008 | Ashton |
| 7,394,946 B2 | 7/2008 | Dewaele |
| 7,584,080 B2 | 9/2009 | Taylor et al. |
| 7,623,709 B2 | 11/2009 | Gering |
| 7,646,898 B1 | 1/2010 | Nowinski et al. |
| 7,773,786 B2 | 8/2010 | Fidrich et al. |
| 7,792,348 B2 | 9/2010 | Russakoff |
| 7,817,836 B2 | 10/2010 | Chao et al. |
| 7,822,244 B2 | 10/2010 | Blumhofer |
| 7,822,291 B2 | 10/2010 | Guetter et al. |
| 7,831,079 B2 | 11/2010 | Kunz et al. |
| 2003/0139659 A1 | 7/2003 | Dale et al. |
| 2003/0228042 A1 | 12/2003 | Sinha |
| 2005/0031202 A1 | 2/2005 | Accomazzi et al. |
| 2005/0069183 A1 | 3/2005 | Ashton |
| 2008/0154118 A1 | 6/2008 | Dale et al. |
| 2008/0267468 A1 | 10/2008 | Geiger et al. |
| 2009/0226060 A1 | 9/2009 | Gering et al. |
| 2009/0297014 A1 | 12/2009 | Nelms et al. |
| 2010/0002921 A1* | 1/2010 | Fenchel et al. ............ 382/128 |
| 2010/0128954 A1* | 5/2010 | Ostrovsky-Berman et al. ............ 382/131 |
| 2010/0266170 A1 | 10/2010 | Khamene et al. |
| 2010/0286995 A1 | 11/2010 | Pekar et al. |
| 2010/0295848 A1 | 11/2010 | Grewer et al. |
| 2011/0007959 A1* | 1/2011 | Schulz et al. ............ 382/131 |
| 2011/0013818 A1 | 1/2011 | Eriksson |
| 2011/0081066 A1* | 4/2011 | Jolly et al. ............ 382/131 |

OTHER PUBLICATIONS

Jurcak et al. "Automated Segmentation of the Quadratus Lumborum Muscle from Magnetic Resonance Images Using a Hybrid Atlas Based-Geodesic Active Contour Scheme." 30th Annual International IEEE EMBS Conference, Aug. 20, 2008, pp. 867-870.*

Patent Cooperation Treaty, Written Opinion and International Search Report dated Aug. 29, 2012, issued on PCT Application No. PCT/CA2012/000353.

Boskovitz et al., "An adaptive neuro-fuzzy system for automatic image segmentation and edge detection", IEEE Transactions on Fuzzy Systems, vol. 10, No. 2, Apr. 2002.

Shokri et al., "Q($\lambda$)-Based Image Thresholding" Proceedings of the First Canadian Conference on Computer and Robot Vision, IEEE, 2004.

* cited by examiner

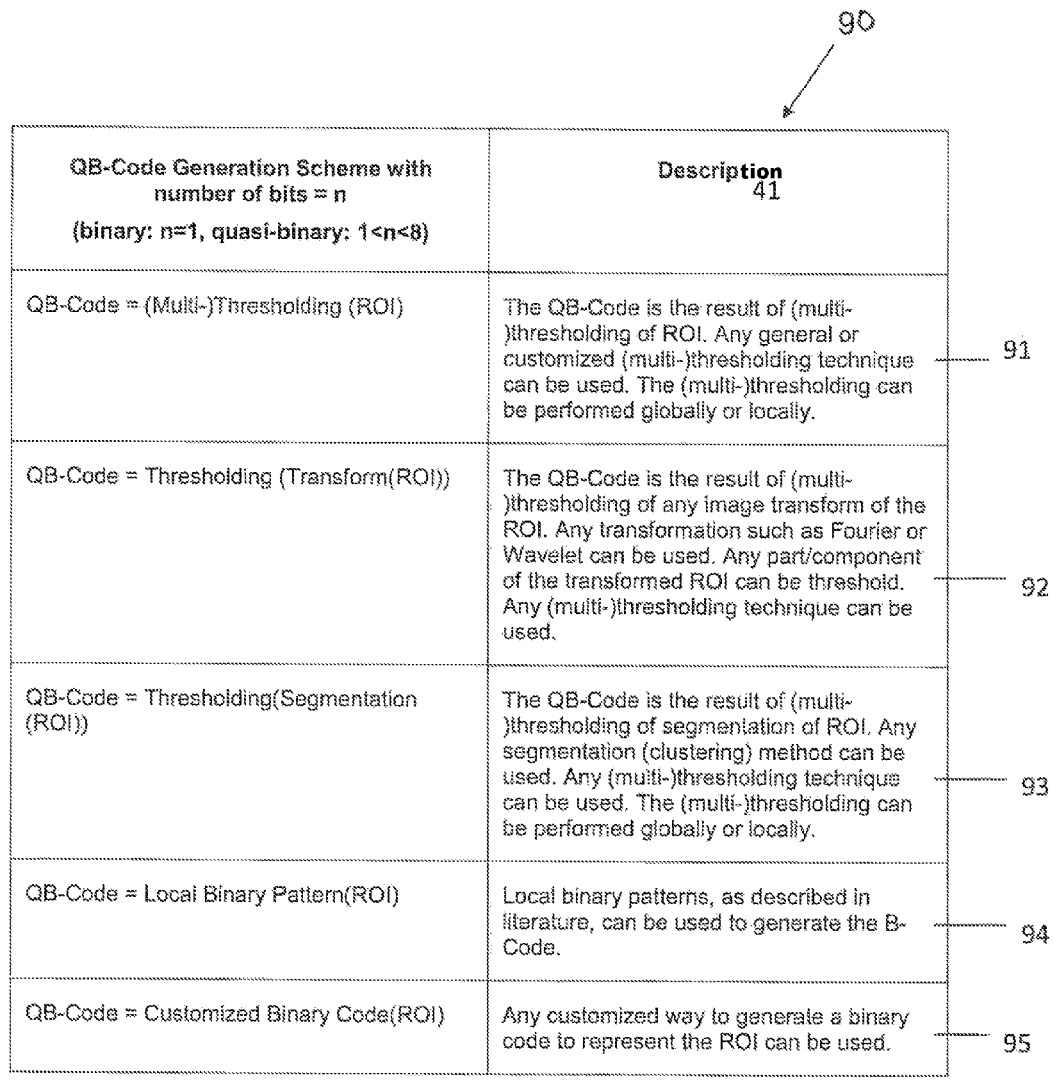

| QB-Code Generation Scheme with number of bits = n (binary: n=1, quasi-binary: 1<n<8) | Description 41 |
|---|---|
| QB-Code = (Multi-)Thresholding (ROI) | The QB-Code is the result of (multi-)thresholding of ROI. Any general or customized (multi-)thresholding technique can be used. The (multi-)thresholding can be performed globally or locally. — 91 |
| QB-Code = Thresholding (Transform(ROI)) | The QB-Code is the result of (multi-)thresholding of any image transform of the ROI. Any transformation such as Fourier or Wavelet can be used. Any part/component of the transformed ROI can be threshold. Any (multi-)thresholding technique can be used. — 92 |
| QB-Code = Thresholding(Segmentation (ROI)) | The QB-Code is the result of (multi-)thresholding of segmentation of ROI. Any segmentation (clustering) method can be used. Any (multi-)thresholding technique can be used. The (multi-)thresholding can be performed globally or locally. — 93 |
| QB-Code = Local Binary Pattern(ROI) | Local binary patterns, as described in literature, can be used to generate the B-Code. — 94 |
| QB-Code = Customized Binary Code(ROI) | Any customized way to generate a binary code to represent the ROI can be used. — 95 |

FIG. 9

METHOD AND SYSTEM FOR BINARY AND QUASI-BINARY ATLAS-BASED AUTO-CONTOURING OF VOLUME SETS IN MEDICAL IMAGES

FIELD OF INVENTION

This invention relates in general to the field of atlas-based segmentation in medical images and more specifically to the field of binary and/or quasi-binary atlas-based auto-contouring of volume sets in medical images.

BACKGROUND OF THE INVENTION

Atlas-based segmentation (ABS) is a well-established and widely used technique for extracting contours in medical images. Generally, ABS is a commonly used method for segmenting medical images. An atlas contains the locations and shapes of organs and/or lesions along with the spatial relationships between them. There are different commonly-used ways to generate an atlas, including: (i) an expert manually segments selected images; or (ii) software generates an atlas by reading and processing multiple segmented images (from one or multiple experts). When an atlas is available then new (unseen) images can be contoured and/or segmented by mapping their coordinate space to that of the atlas, such that the anatomical boundaries are correctly marked (a process called image registration). In the registration process the images in the atlas are registered against the new image. The registered images are then compared against the new image to find the best matching registered image. Afterward, the corresponding image transformation, obtained by the registration process, is applied to the contour of the best matching image. The contour is then deformed and mapped to the new image.

The accuracy of the ABS mainly depends on two factors: (i) the size of the atlas; and (ii) the performance of image registration. Large atlases (meaning atlases that comprise one or multiple atlases) and sophisticated registration algorithms can be employed to increase the accuracy of the contouring. However, using large and comprehensive atlases can reduce computational efficiency such that the results can be provided after long searching and registration times.

Prior art ABS systems and methods are disclosed in the following prior art references: U.S. Pat. No. 6,901,156 having the title METHOD, SYSTEM AND COMPUTER READABLE MEDIUM FOR AN INTELLIGENT SEARCH WORKSTATION FOR COMPUTER ASSISTED INTERPRETATION OF MEDICAL IMAGES;

U.S. Pat. No. 6,950,544 having the title AUTOMATED MEASUREMENT OF ANATOMICAL STRUCTURES IN MEDICAL IMAGING;

U.S. Pat. No. 7,245,766 having the title METHOD AND APPARATUS FOR DETERMINING A REGION IN AN IMAGE BASED ON A USER INPUT;

U.S. Pat. No. 7,324,842 having the title ATLAS AND METHODS FOR SEGMENTATION AND ALIGNMENT OF ANATOMICAL DATA;

U.S. Pat. No. 7,324,842 having the title ATLAS AND METHODS FOR SEGMENTATION AND ALIGNMENT OF ANATOMICAL DATA;

U.S. Pat. No. 7,327,138 having the title METHOD FOR GENERATING AN MR ATLAS AND FOR MR IMAGING USING SAME;

U.S. Pat. No. 7,333,644 having the title SYSTEMS AND METHODS FOR PROVIDING AUTOMATIC 3D LESION SEGMENTATION AND MEASUREMENTS;

U.S. Pat. No. 7,340,082 having the title METHOD AND MEDICAL IMAGING APPARATUS FOR DETERMINING A SLICE IN AN EXAMINATION VOLUME FOR DATA ACQUISITION IN THE SLICE;

U.S. Pat. No. 7,346,201 having the title SEMI-AUTOMATED MEASUREMENT OF ANATOMICAL STRUCTURES USING STATISTICAL AND MORPHOLOGICAL PRIORS;

U.S. Pat. No. 7,394,946 having the title METHOD FOR AUTOMATICALLY MAPPING OF GEOMETRIC OBJECTS IN DIGITAL MEDICAL IMAGES;

U.S. Pat. No. 7,584,080 having the title CONSTRUCTING A STATISTICAL SHAPE MODEL FROM TWO-DIMENSIONAL OR THREE-DIMENSIONAL DATA;

U.S. Pat. No. 7,623,709 having the title METHOD AND SYSTEM FOR SEGMENTING IMAGE DATA;

U.S. Pat. No. 7,646,898 having the title METHODS AND APPARATUS FOR PROCESSING MEDICAL IMAGES;

U.S. Pat. No. 7,773,786 having the title METHOD AND APPARATUS FOR THREE-DIMENSIONAL INTERACTIVE TOOLS FOR SEMI-AUTOMATIC SEGMENTATION AND EDITING OF IMAGE OBJECTS;

U.S. Pat. No. 7,792,348 having the title METHOD AND APPARATUS OF USING PROBABILISTIC ATLAS FOR CANCER DETECTION;

U.S. Pat. No. 7,817,836 having the title METHODS FOR VOLUMETRIC CONTOURING WITH EXPERT GUIDANCE;

U.S. Pat. No. 7,822,244 having the title SEGMENTING MEDICAL IMAGE DATA SETS;

U.S. Pat. No. 7,822,291 having the title NON-RIGID MULTI-MODAL REGISTRATION USING STATISTICAL LEARNING METHODS;

U.S. Pat. No. 7,831,079 having the title SEGMENTATION OF ANATOMIC STRUCTURES USING NAVIGATION TABLE;

U.S. Patent Application Publication No. 20030139659 having the title ATLAS AND METHODS FOR SEGMENTATION AND ALIGNMENT OF ANATOMICAL DATA;

U.S. Patent Application Publication No. 20030228042 having the title METHOD AND SYSTEM FOR PREPARATION OF CUSTOMIZED IMAGING ATLAS AND REGISTRATION WITH PATIENT IMAGES;

U.S. Patent Application Publication No. 20050031202 having the title IMAGE REGION SEGMENTATION SYSTEM AND METHOD;

U.S. Patent Application Publication No. 20050069183 having the title SEMI-AUTOMATED MEASUREMENT OF ANATOMICAL STRUCTURES USING STATISTICAL AND MORPHOLOGICAL PRIORS;

U.S. Patent Application Publication No. 20080267468 having the title SYSTEM AND METHOD FOR SEGMENTING A REGION IN A MEDICAL IMAGE;

U.S. Patent Application Publication No. 20090226060 having the title METHOD AND SYSTEM FOR IMPROVED IMAGE SEGMENTATION;

U.S. Patent Application Publication No. 20100266170 having the title METHODS AND SYSTEMS FOR FULLY AUTOMATIC SEGMENTATION OF MEDICAL IMAGES;

U.S. Patent Application Publication No. 20100286995 having the title INTERACTIVE ATLAS TO IMAGE REGISTRATION;

U.S. Patent Application Publication No. 20100295848 having the title INTERACTIVE IMAGE SEGMENTATION;

U.S. Patent Application Publication No. 20110013818 having the title 3D MEDICAL IMAGE SEGMENTATION;

U.S. Patent Application Publication No. 20090297014 having the title SYSTEM FOR ASSESSING RADIATION TREATMENT PLAN SEGMENTATIONS; and U.S. Patent Application Publication No. 20090226060 having the title METHOD AND SYSTEM FOR IMPROVED IMAGE SEGMENTATION.

SUMMARY OF THE INVENTION

In one aspect, the present disclosure relates to a method of QB-Code generation to efficiently use atlas-based segmentation using any of binary or quasi-binary representations of image regions of interest, or a combination of binary and quasi-binary representation of image regions of interest, said method characterized in that it comprises the following steps: identifying one or more regions of interest in an image; generating a QB-code for the one or more regions of interest by searching to identify an applicable QB-Code in any of the following: a binary atlas; or a quasi-binary atlas; and determining a gold standard contour, said gold standard contour being attached to the generated QB-Code.

Said method characterized in that it may comprise the further step of generating the QB-Code in accordance with one or more of the following schemes: a pure binary atlas segmentation; a quasi-binary atlas segmentation; a binary controlled atlas segmentation; or a quasi-binary controlled atlas segmentation.

Said method characterized in that it may comprise the further step of atlas segmentation with registration of QB-Codes.

The method characterized in that it may comprise the further step of utilizing the QB-Code and apply sequential edit propagation to achieve fast slice-by-slice auto-contouring of volume image data.

Said method characterized in that it may comprise the further step of achieving fast slice-by-slice auto-contouring of volume image data by the following steps of: generating or receiving a slice of the ROI as a contoured ROI; and repeating the following steps until all images are processed: editing the contoured ROI and inserting the edited contoured ROI and the associated QB-code into the binary and/or quasi-binary atlas; and automatically segmenting a next slice by propagating the contoured ROI and an associated gold standard contour.

Said method characterized in that it may comprise one or more of the further following steps: inserting the edited contoured ROI into a binary atlas; inserting the edited contoured ROI into a quasi-binary atlas; inserting the edited contoured ROI into a binary controlled atlas; or inserting the edited contoured ROI into a quasi-binary controlled atlas.

Said method characterized in that it may comprise the further step of generating the QB-Code by one or more of the following steps: thresholding the ROI; thresholding to transform the ROI; thresholding to segment the ROI; generating a local binary pattern involving the ROI; and generating a customized binary code involving the ROI.

Said method characterized in that it may comprise the further step of generating the QB-Code by one or more of the following steps: (multi-) thresholding the ROI; (multi-) thresholding to transform the ROI; (multi-) thresholding to segment the ROI; generating a local binary pattern involving the ROI; and generating a customized binary code involving the ROI.

Said method characterized in that it may comprise the further following steps: creating the binary atlas or quasi-binary atlas; grouping atlas entries; generating one or more representative samples for each group of atlas entries; and repeating the following steps until QB-Code is generated for each of the one or more representative samples for each group: generating QB-Code for each of the one or more representative samples for each group; and querying whether QB-Code is generated for each group.

Said method characterized in that it may comprise the further step of creating the binary atlas or quasi-binary atlas to generate a pure QBinary atlas, or a QBinary controlled atlas.

Said method characterized in that it may comprise the further step of utilizing an image registration algorithm for QB-Code generation.

Said method characterized in that it may comprise the further step of registering the QB-Codes.

In another aspect, the present disclosure relates to a system of QB-Code generation to efficiently implement atlas-based segmentation using any of binary or quasi-binary representations of image regions of interest, or a combination of binary and quasi-binary representation of image regions of interest, said system characterized in that it comprises: one or more images with contours; a QB-Code Generator operable to receive the one or more images and a number of bits, and to utilize the one or more images and number of bits to generate QB-Code; and an atlas creation means operable to receive atlas type input and to generate an atlas.

Said system characterized in that it may further comprise the atlas creation means being operable to generate the atlas as a binary atlas or as a QBinary-controlled atlas.

Said system characterized in that it may further comprise the QB-Code Generator being operable to identify one or more regions of interest (ROI) in the one or more images and to use the ROI in the generation of QB-Code.

Said system characterized in that it may further comprise a display means, whereby contour of the one or more images are displayable to a user.

Said system characterized in that it may further comprise an atlas search means operable to perform an atlas search.

Said system characterized in that it may further comprise one or more training modes.

Said system characterized in that it may further comprise one or more of the following: an atlas creation training mode involving sequential processing of a list of images; and an atlas creation training mode involving grouping of similar samples.

Said system characterized in that it may further comprise a means for segmenting images operable in an interactive mode.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIG. 9 shows a table that provides examples of different schemes for generation of a QB-Code of an embodiment of the present invention.

Figure 1:
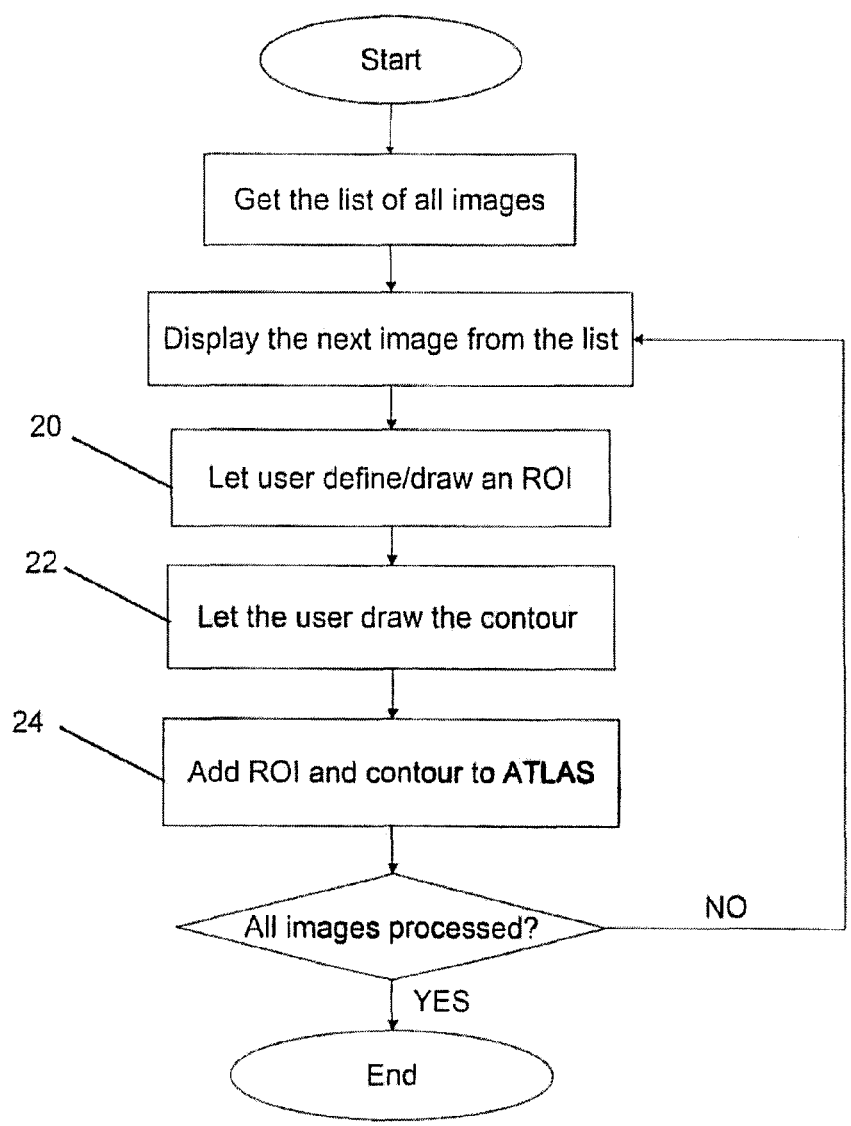
FIG. 1 shows an example of prior art atlas creation.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a system and method that incorporates set of algorithms and/or calculations that may be applied to efficiently use atlas-based segmentation using QBinary representations, including binary and/or quasi-binary, of images and/or their regions of interest (ROIs). A QBinary representation of an image or a part of an image, including an ROI, may be a binary image, for example, such as including binary code, or a quasi-binary image, that serves to represent that image and/or ROI in an atlas. Two-dimensional QBinary codes may be used to construct either or both QBinary atlases and QBinary-controlled atlases. Additionally, the present invention may incorporate a set of algorithms to sequentially auto-contour, or auto-segment, individual slices of a volume set of digital images, provided one slice is semi-automatically contoured by a human operator.

The term "QBinary" as used herein means quasi-binary or binary codes. If n represents the numbers of bits in an image (generally n=8, 12, 16, 24, etc.), a binary code has n=1 and a quasi-binary code has n<8. Herein QBinary or QB-Code means binary or quasi-binary code.

The present invention differs from the prior art. An example of a prior art atlas-based segmentation (ABS) system is shown in FIG. 1. The conventional, prior art, ABS generally starts with atlas creation. A user will create regions of interest (ROIs) 20 along with the corresponding contours 22. All available images are displayed one after another, and an experienced user defines an ROI and contours (delineates) the object of interest within the ROI, for example, such as by lesions and organs. Subsequently, the ROI and the corresponding contour, which is often called a gold standard image/segment, are saved 24. After processing all available images, the atlas comprises of many ROIs and their corresponding gold standard contours.

In the present invention, as discussed herein, an ROI may include the whole of an image, or a part of an image. Moreover, one or multiple ROIs may be utilized by the present invention.

The present invention may relate to the field of medical imaging and analysis of the different modalities for use in diagnosis and treatment planning and post-treatment surveillance of diseases, especially cancer. Such modalities may include, for example: Computer Tomography; Magnetic Resonance Imaging; Ultrasound imaging or sonography; Positron Emission Tomography; Elastography; a fusion of some of these modalities; etc. Additionally, the present invention may be applied to any set, or sets, of digital images if the sequence of images depicts scenes and/or objects of the same nature over a period of time. For example, such as images in video processing and editing.

The present invention may offer benefits and advantages over known prior art in that known prior art may experience reduced computational efficiency when using large and comprehensive atlases, such that the results can only be provided after long searching and/or registration, and registration times. To solve this problem, the present invention may employ QBinary and QBinary-controlled atlases for efficient saving and/or storage of the atlas images and fast searching and/or registration to find a similar case. In this context, the atlas creation and access (for example, such as a search in the atlas) may be in the foreground of the present invention. Any image registration may be employed, or it may be omitted by providing user inputs to guide the system. As well, new and/or modified and/or customized registration algorithms may be employed to exploit the binary and/or quasi-binary structure of the codes in order to accelerate the registration process.

The present invention may use two-dimensional QBinary codes to represent medical images or parts of medical images, for example, such as lesions, organs and tissue types. By using two-dimensional QBinary codes to represent medical images or parts of medical images the present invention may facilitate compact storage. The present invention may further facilitate fast searching in atlas-based segmentation or any other image retrieval task.

The present invention may use two-dimensional QBinary codes to construct a purely QBinary atlas. The two-dimensional QBinary codes may be used to represent similar groups and/or clusters in a database of images, for example, such as an atlas. The present invention may create atlases that are either binary 100 or QBinary-controlled 102, as shown in FIG. 10.

Figure 10:
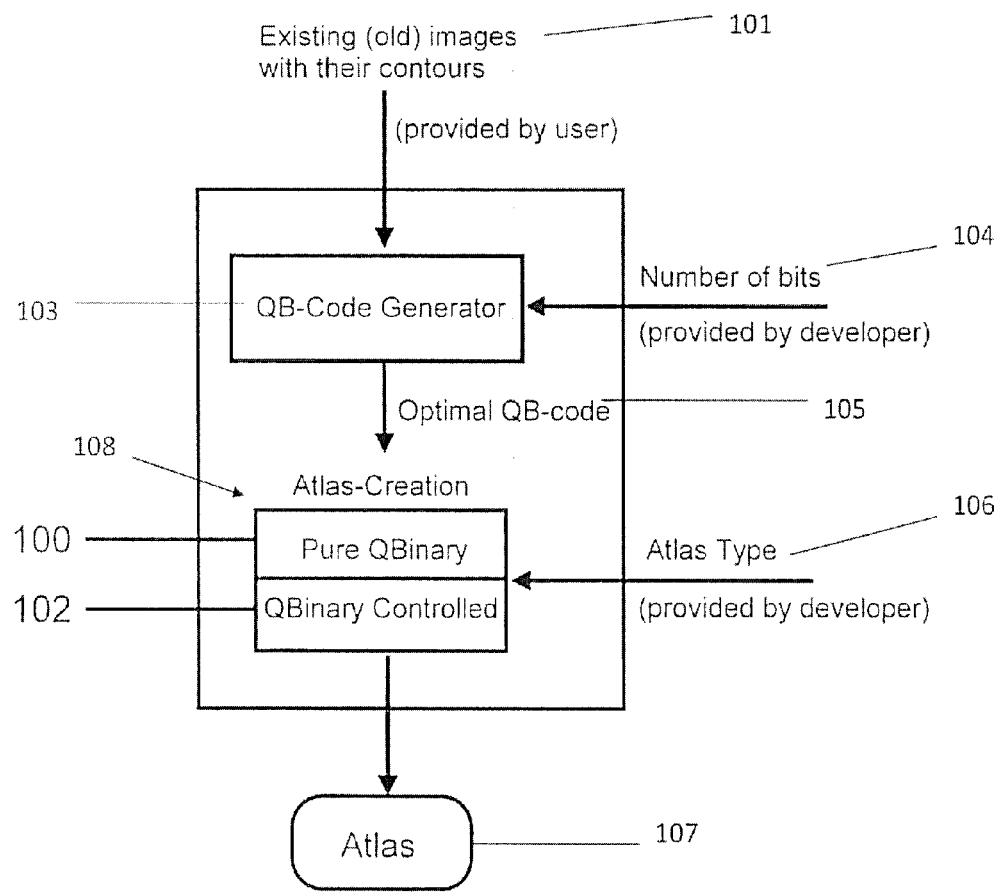
FIG. 10 shows an example of an overall picture for atlas creation (QBinary or QBinary-controlled) of an embodiment of the present invention.

As shown in FIG. 10, an atlas may be produced by the present invention by a system that includes a QB-Code Generator 103, an Atlas Creation means 108 that may be operable to be Pure QBinary 100 and/or QBinary Controlled 102. Existing images 101, that may be old images, with their contours may be input to the QB-Code Generator 103. The input of the images may be undertaken by a user, and the input may be by digital transfer, or other means. The QB-Code Generator may receive a number of bit 104, for example, such as the number of bits may be provided by a developer. The QB-Code Generator may produce optimal QB-Code 105, and this may be transferred to the Atlas Creation means 108. The Atlas Creation means may receive atlas type input 106, for example, such as the atlas type input being provided by the developer. The Atlas Creation means may undertake processing in accordance with the atlas type input that is Pure QBinary 100 and/or QBinary Controlled 102, to generate an atlas 107 that is either Pure QBinary or QBinary Controlled.

In one embodiment of the present invention propagation of two-dimensional QBinary codes across different slices and/or images of the same patient may occur. Fast auto-contouring of volume data by sequential edit propagation may be performed by the present invention. For example, edited results may be regarded as an adopted or replacement gold standard images and/or contours, for example such adopted or replacement gold standard images and/or contours may be determined on-the-fly, or in a similar short-term manner. The adopted or replacement gold standard images and/or contours may be assigned to the two-dimensional QBinary code of the same image. The present invention may exploit inter-slice redundancies to auto-segment neighbouring slices, if one is already segmented.

A skilled reader will recognize that a variety of embodiments of the present invention may be possible. The following describes one example of an embodiment of the present invention, but other embodiments are possible.

QB-Code Generator

Figure 2:
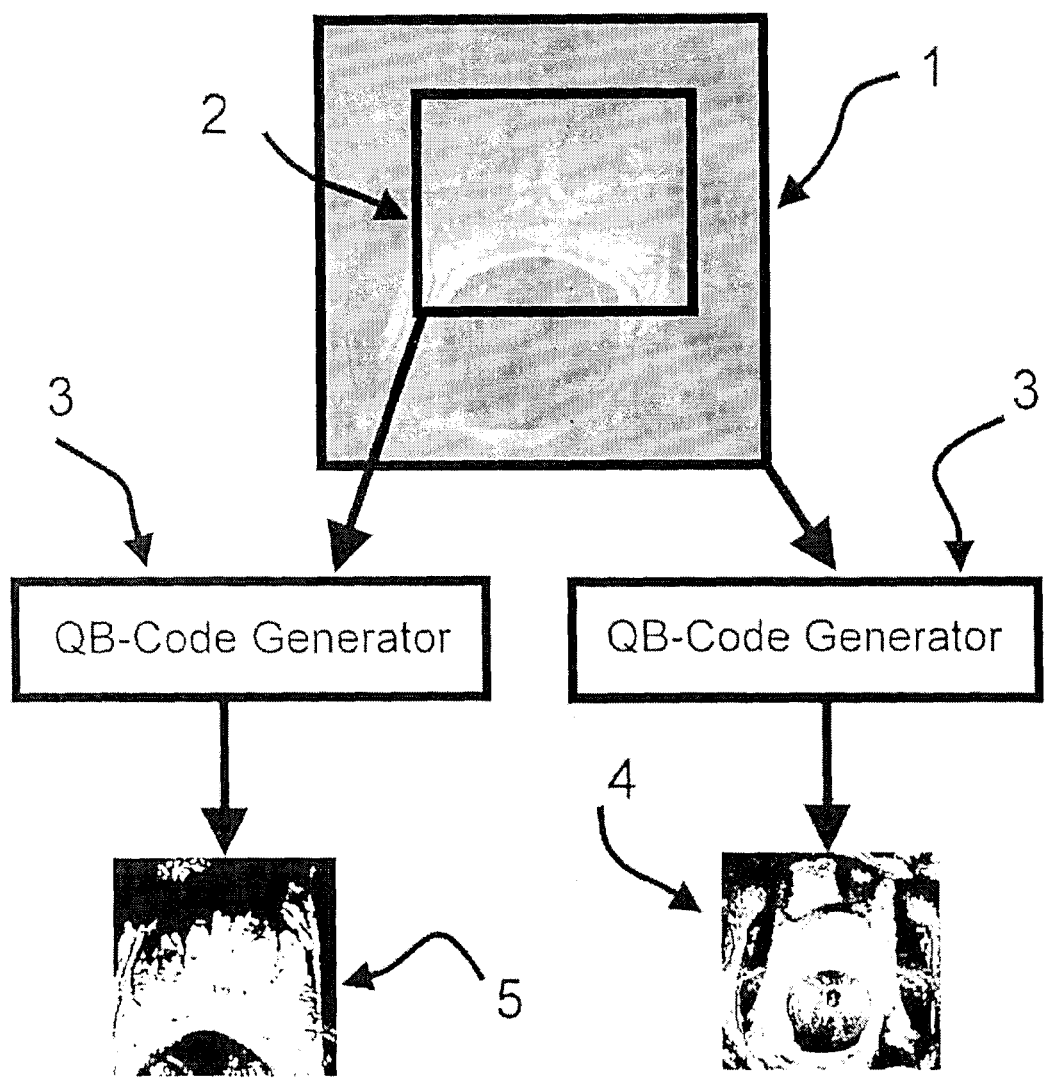
FIG. 2 shows an example of QB-code generation of an embodiment of the present invention.

One embodiment of the present invention may represent an image, or parts of an image, for example, such as one or more ROIs, as a two-dimensional QBinary code. Such two-dimensional binary code may be a short QB-Code. A QB-Code Generator 3, as shown in FIG. 2, may be incorporated in, or integrated with, the present invention. QB-code generation may utilize either an entire image 1, or parts of an image 2, for example, such as one or multiple ROIs, as the input of the QB-Code Generator 3. The generator may be operable to generate a QBinary code for either the entire image 4, or for one or multiple ROIs 5 inside the image. A skilled reader will recognize that for (multi-) thresholding any pixel classification method, or ensemble of methods, that can generate images with n=1, 2, . . . 7 bits may be applied in the present invention. The term "thresholding" as used herein may be generally understood to mean generating binary or quasi-binary images, and may include a multi-bits aspect even if this aspect is not explicitly referenced.

Figure 3:
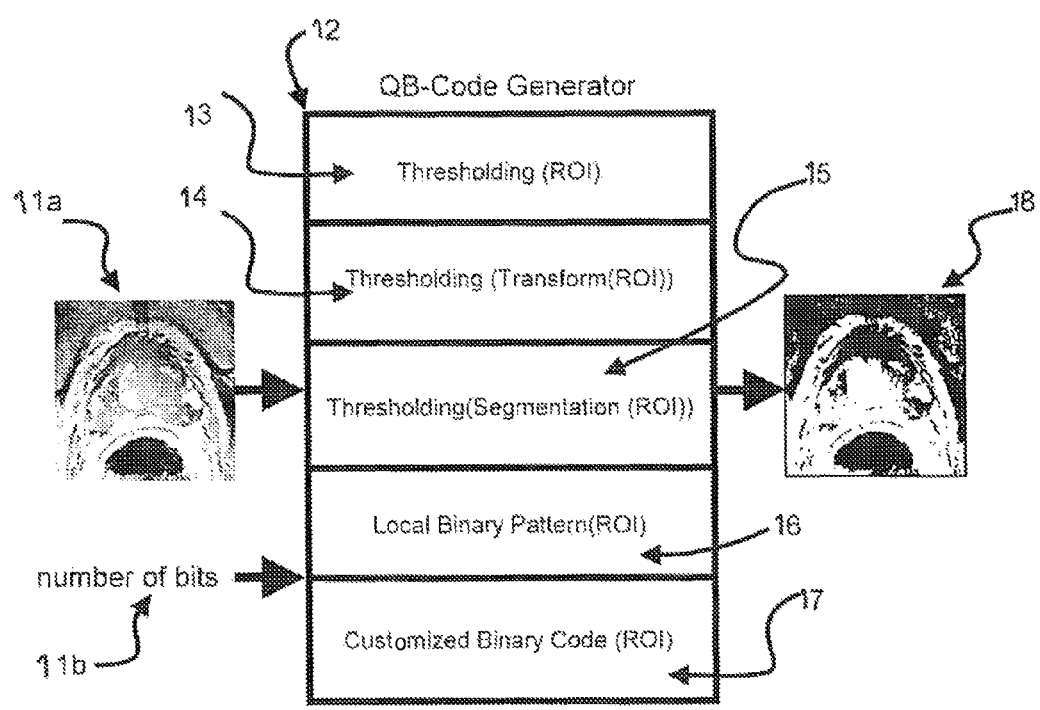
FIG. 3 shows an example of QB-code generation of an embodiment of the present invention.

As shown in FIG. 3, QB-code generation may involve different schemes being embedded to generate a QB-Code. An ROI 11*a* (that may be, for example, either the whole of the image, or one or more parts of the image) along with required and/or desired number of bits 11*b* may be utilized by the QB-Code Generator 12. In some embodiments of the present invention a form of the ROI 18 may be output by the QB-Code Generator. The QB-Code Generator 12 may use different schemes (each scheme may include a number of steps, for example, such as the steps that include thresholding (ROI) 13, thresholding (transform ROI) 14, thresholding (segmentation ROI) 15, local binary pattern (ROI) 16 and customized binary code (ROI) 17, a skilled reader will recognize that in other embodiments of the present invention other steps may be integrated in the present invention) to generate a two-dimensional QBinary code 18 representing the image, or one or more ROIs of the image. The thresholding of steps 13, 14 and 15 may be (multi-) thresholding in some embodiments of the present invention.

The present invention may be modality independent. For example, the present invention may be applied on CT, MR, ultrasound scans, etc. The present invention may further be fast. The speed of the present invention may be directly related to the use of QB-Codes in the present invention. A QB-Code may be a QBinary representation of images or parts of the images, for example, such as one or more ROIs. The QB-Code of a lesion may be known as a "LesionCode". The QB-Code of an organ may be known as an "OrganCode". The QB-Code of a tissue may be known as a "TissueCode".

Figure 13:
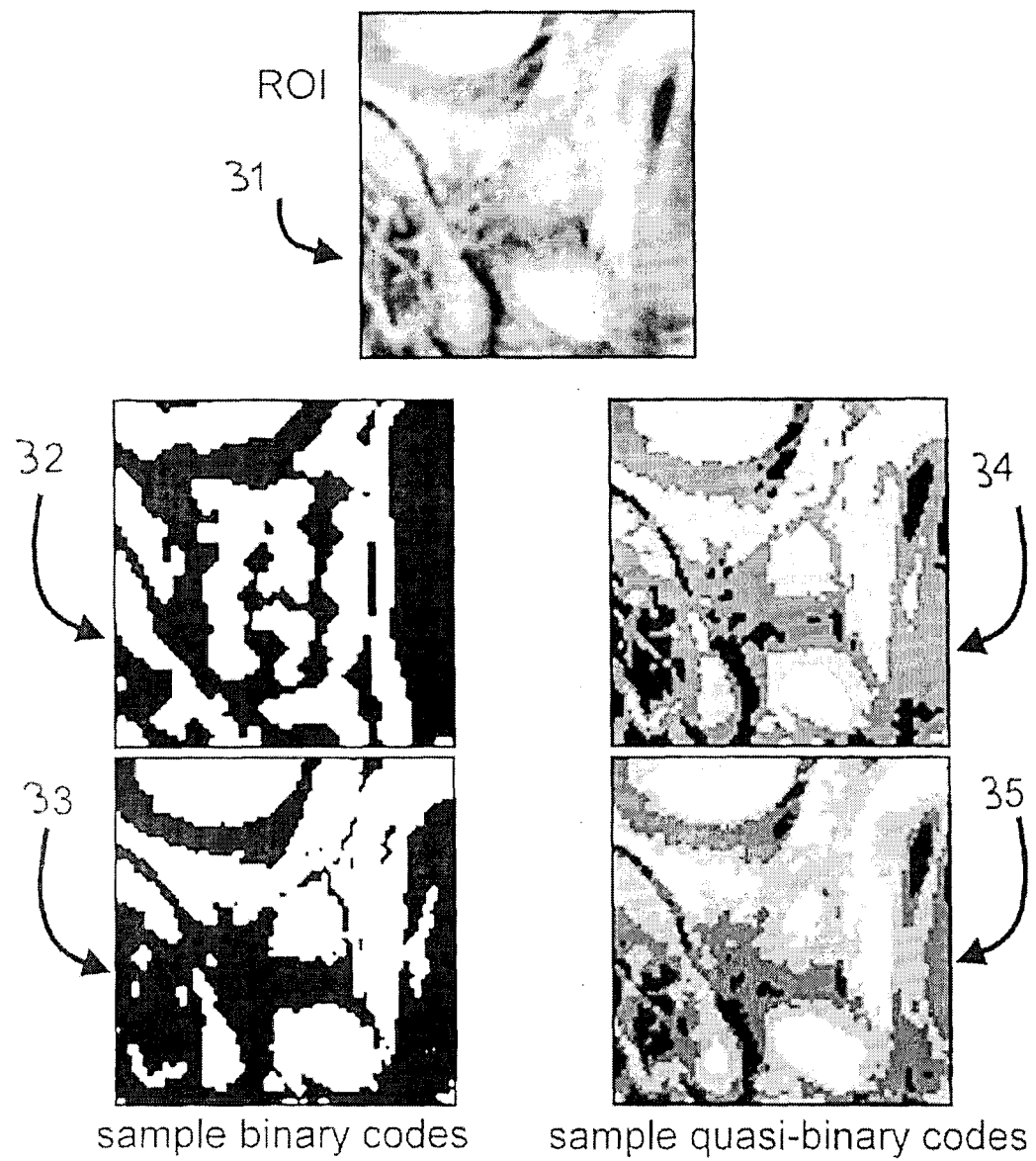
FIG. 13 shows examples of ROI and the corresponding QBinary codes of an embodiment of the present invention.

Examples of sample QB-Codes are shown in FIG. 13. An ROI 31 (that is an image or part of the image) is converted into a binary representation 32, 33 or a quasi-binary representation 34, 35.

A QB-Code may be generated by the present invention in different ways, such as by different schemes. For example, assuming the ROI is the region of interest in an image, then the QB-Code that may be extracted may be established by a set of steps, as shown in FIG. 9. The steps shown in FIG. 9 represent a possible type of a QB-Code generation scheme that may be utilized by the present invention. The QB-Code generation scheme shown in table 90 of FIG. 9 includes the steps of (multi-) thresholding (ROI) 91, thresholding (transform (ROI)) 92, thresholding (segmentation (ROI)) 93, local binary pattern (ROI) 94, and customized binary code (ROI) 95. A skilled reader will recognize that other steps may be included in other QB-Code generation schemes of other embodiments of the present invention.

The (multi-) thresholding (ROI) step 91, may involve the QB-Code being the result of (multi-) thresholding of ROI. Any general or customized (multi-) thresholding technique can be used for this step and the technique may be performed globally or locally.

The thresholding (transform (ROI)) step 92, may involve the QB-Code of any image that is generated as a result of (multi-) thresholding step 91 being utilized to transform the ROI. Any transformation process, for example, such as Fourier or Wavelet, may be used for this step. Any part and/or component of the transformed ROI may be thresholded, and any (multi-) thresholding technique may be used.

The thresholding (segmentation (ROI)) step 93, may result in QB-Code from (multi-) thresholding of segmentation of ROI. Any segmentation and/or clustering method may be utilized for this step, as may any (multi-) thresholding technique. The (multi-) thresholding may be performed globally or locally.

The local binary pattern (ROI) step 94, may produce local binary patterns which may be used to generate QB-Code.

The customized binary code (ROI) step 95, may generate binary code to represent the ROI through the application of a customized means.

The best QBinary representation for a particular application to which the present invention is employed, may be determined during a training phase. For example, application to which the present invention may be employed may include prostate MRI, liver CT, brain MRI, etc. The best QB-Code for a particular application to which the present invention is employed may be the one that can segment new images with highest accuracy.

Embodiments of the present invention may utilize a QB-Code generator that is operable to try out different types of (multi-)thresholding, and to select the best type. The best type may be identified by the present invention as the type that achieved elements of speed and accuracy. This may be a one-time calibration process. Several factors may be considered by the present invention in the course of identifying the optimal means of generating the QB-code. The following factors are provided as examples of such factors.

1. ROI Normalization: The ROI utilized by the present invention may require normalization in order to minimize the effects of illumination, contrast, noise, bit depth, artifacts, etc. In embodiments of the present invention the normalization may be a customized in-house developed procedure. For example, the normalization may generally include activities such as the following: (i) converting the ROI to a specified number of bits; (ii) adjusting the contrast; and (iii) suppressing noise.

2. Proper QB-code size: The normalized region of interest (NROI) may be of any size. The size may in some embodiments of the present invention be dependant on the initial resolution of the images. The QB-code may have a fixed size, for example, such as approximately 256×256, or approximately 128×128, etc. The present invention may determine that a particular QB-code size may be appropriate to achieve a balance between speed and accuracy for a particular employment of the present invention. For example a QB-code may be chosen by the present invention in accordance with the size weight.

3. Persevering the structural information: The (multi-)thresholding should contain all structural information. For example, structural information may include all relevant edges which provide clues for guessing the shape of an object, such as a lesion and/or organ, to be segmented. In one embodiment of the present invention, the NROI may be (multi-)thresholded with the described approaches and its similarity with a Canny edge may be measured to determine which QB-code (multi-)thresholding may provide higher structural information. The weight, being the edge weight, may be combined with an achievable accuracy when different QB-codes are used for: training, thereby representing training weight; and the size relevance, which may be the size weight. The combined weight may guide the selection of the preferred QB-code for each code.

Figure 11:
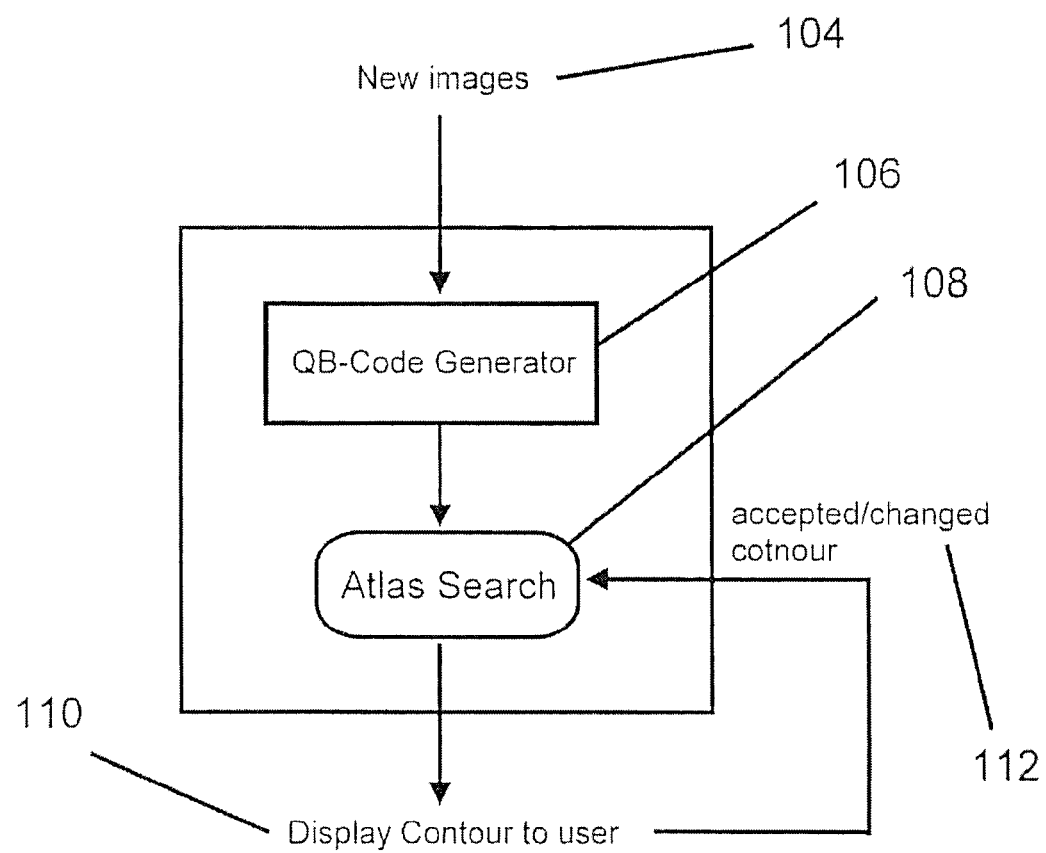
FIG. 11 shows an example of an overall picture using QBinary or QBinary-controlled atlas-based segmentation of an embodiment of the present invention.

In one embodiment of the present invention, as shown in FIG. 11, an ROI or image 104 may be introduced to a QB-Code generator 106. An atlas search 108 may be utilized to determine a contour which may be displayed to a user 110. Display to a user may be by any display means linked or otherwise connected to the present invention either wired or wirelessly. The user may accept or change the contour and the results of this activity may be saved or otherwise stored in the atlas 112.

The following disclosure provides examples of possible schemes that may be applied by the present invention to generate a QB-Code. Such examples include pure QBinary atlas segmentation 100 and QBinary-controlled atlas-based segmentation 102, as shown in FIG. 10. A skilled reader will recognize that these are provided merely as possible examples of schemes that may be applied in embodiments of the present invention. Other embodiments of the present invention applying other schemes may also be possible.

Pure QBinary Atlas Segmentation (P-BAS)

In atlas-based segmentation (ABS) known in the prior art, images or their ROIs may be saved directly and may be under-sampled. In some prior art examples multiple images or their ROIs may be under-sampled and averaged. Such images may then be saved to serve as "thumbnails" in the atlas.

The Pure QBinary Atlas Segmentation (P-BAS) of the present invention may utilize aspects of the idea of atlas segmentation, but P-BAS may utilize QB-Codes, for example, such as in the manner that follows.

Figure 4:
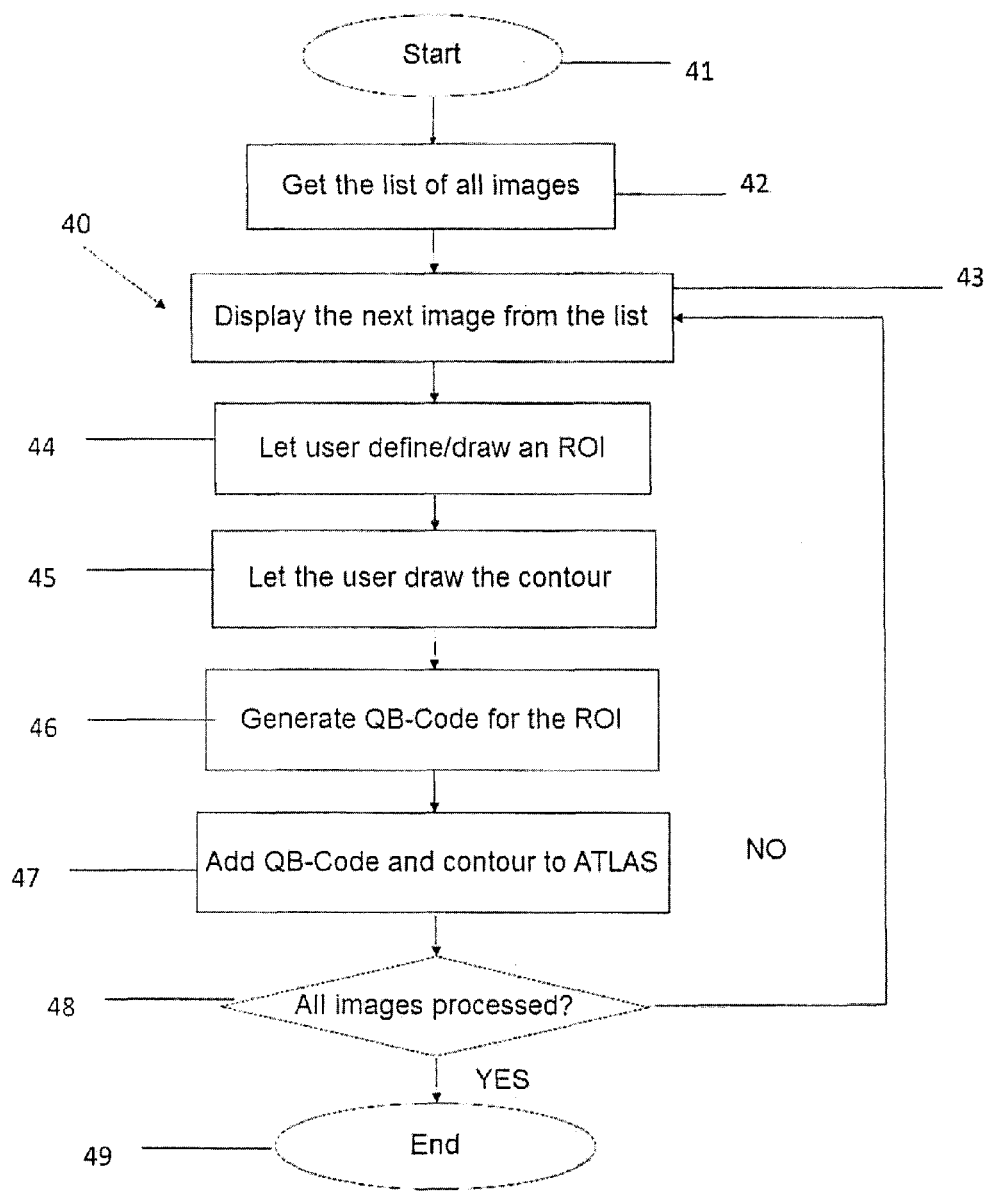
FIG. 4 shows an example of QBinary atlas creation of an embodiment of the present invention.

The present invention may include atlas creation, and this may be applied as a training mode 40, as shown in FIG. 4. QBinary atlas creation may be undertaken whereby, instead of attaining grey-level images, the present invention QBinary codes may be created along with gold standard contours. Specifically the present invention may create a QBinary atlas by generating QB-codes for each image and/or ROI. The present invention may further associate the gold standard contour and/or image to each QB-Code.

The steps involved in a training mode 40 of the present invention, as shown in FIG. 4, may include starting the training mode 41. Once the mode has started a list of images may be obtained 42. Images form the list may be displayed individually in sequence 43. A user may define and/or draw an ROI in a displayed image 44. A user may draw a contour 45. QB-Code may be generated for the ROI 46. The QB-Code and contour may be added to the atlas 47. The system and method of the present invention may query whether all of the images have been processed 48, and repeat steps 43-47 for each of the images as long as images in the list remain unprocessed. Once the response to the query is that all images have been processed the mode will end 49.

Figure 5:
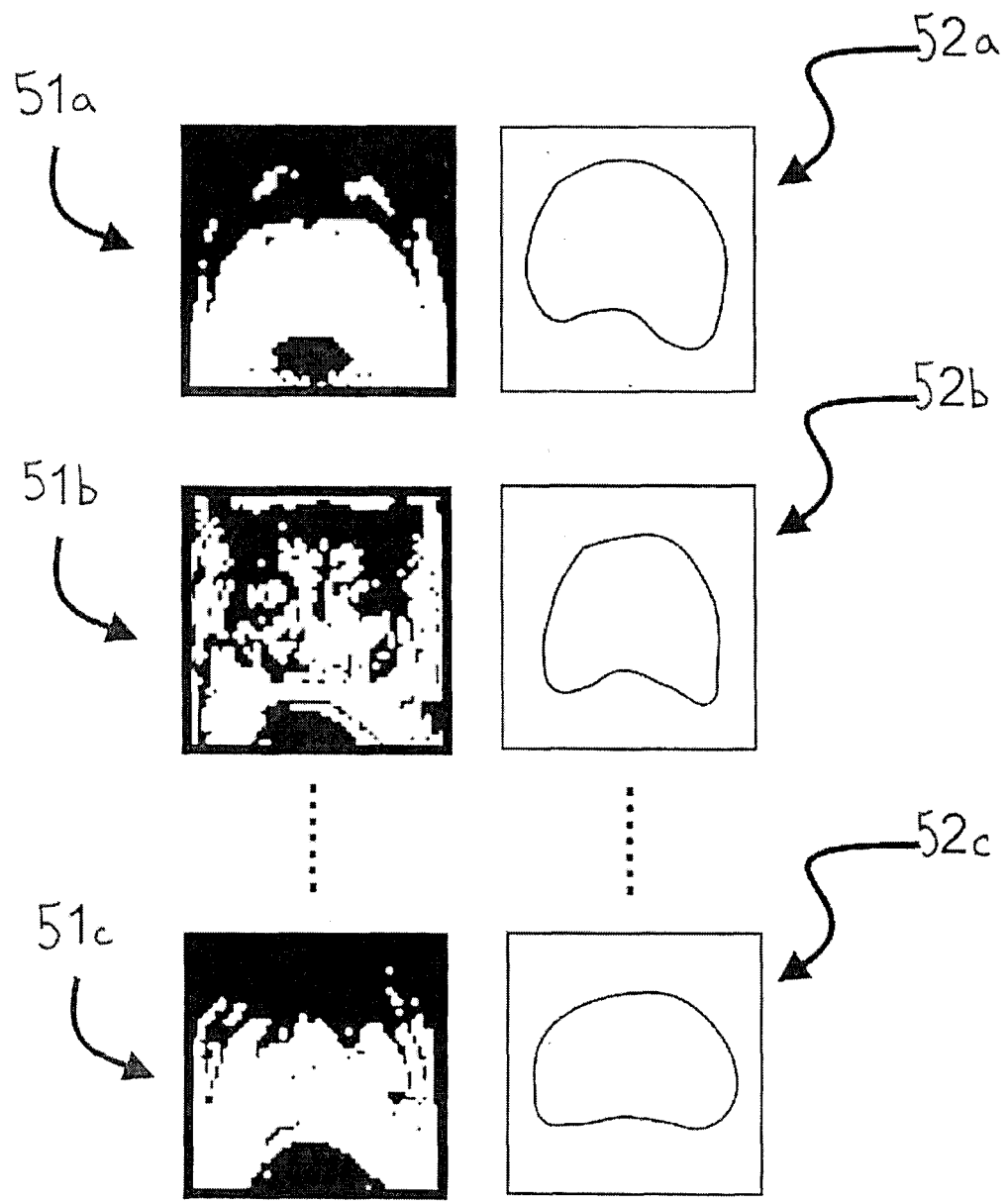
FIG. 5 shows an example of pure QBinary (just binary) atlas segmentation of an embodiment of the present invention.

The present invention may include segmentation of images 51a, 51b, 51c, as shown in FIG. 5. The images may be new images. The segmentation of images may be applied as an interactive mode, for example, such as shown in FIG. 5. P-BAS may involve each QB-Code being attached to a gold standard contour. The present invention may find the most similar QB-Code to provide the gold standard contour 52a, 52b, 52c, as shown in FIG. 5. The present invention may therefore generate a QB-Code for any new image.

The present invention may further search in the binary atlas to find the most similar QB-Code. For example, the present invention may use XOR-based, mutual information, or correlation-based similarity measures in the searching process to achieve fast comparisons. Prior to the compressions, the QB-Codes stored in the atlas may be transformed via any image registration algorithm or calculation to better match the new image's QB-Code. The gold standard contour that is determined as a result of the search may be utilized by the present invention. In one embodiment of the present invention the contour may be registered.

Quasi-Binary-Controlled Atlas Segmentation (B-CAS)

The present invention may incorporate QBinary-Controlled Atlas Segmentation (B-CAS), which may function with QB-Codes. B-CAS of the present invention may be utilized to accelerate the searching process. Embodiments of the present invention that apply B-CAS may include the following atlas creation and/or segmentation of images.

Figure 6:
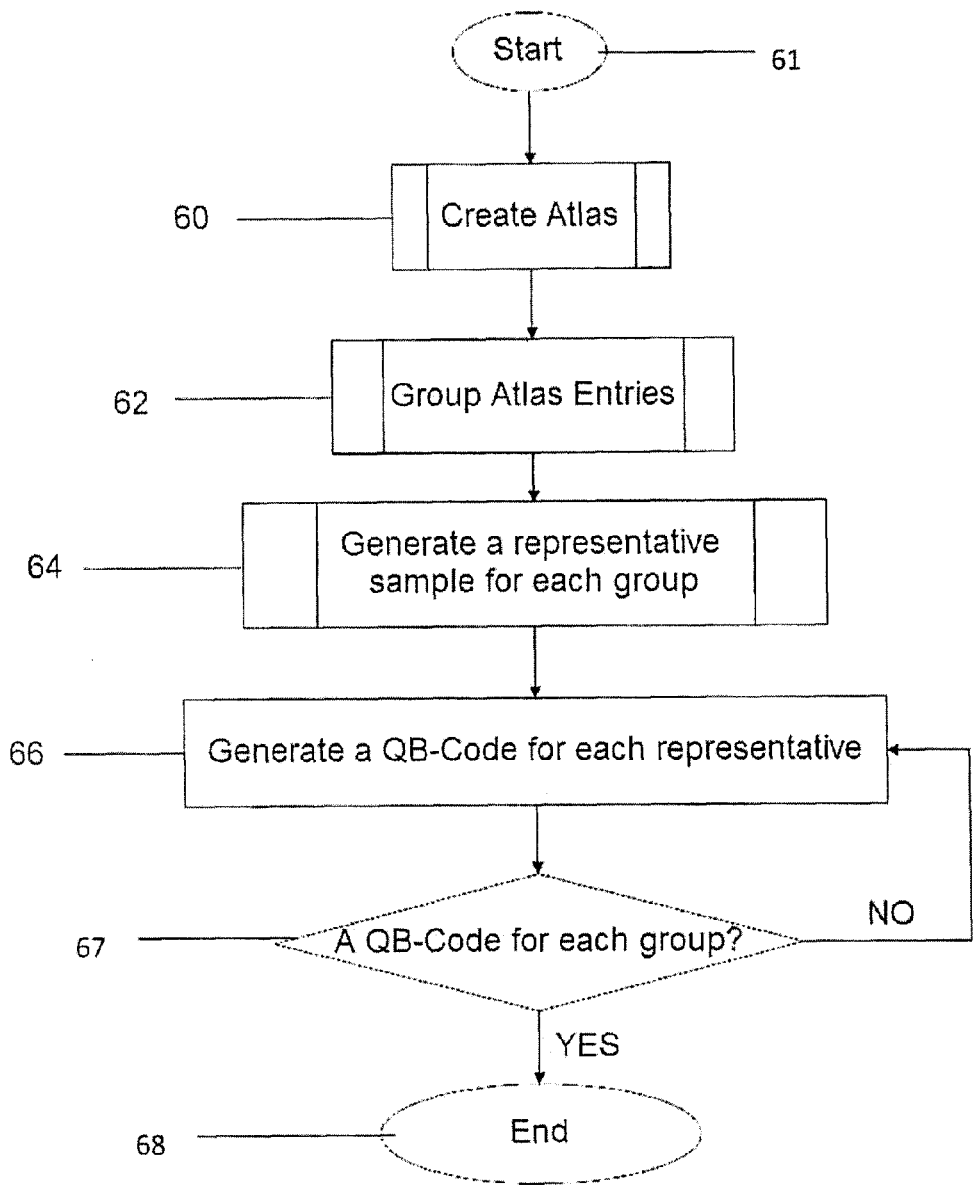
FIG. 6 shows an example of QBinary controlled atlas creation of an embodiment of the present invention.

The present invention may include atlas creation, and this may be applied as a training mode, as shown in FIG. 6. B-CAS may be applied so that similar images and/or ROIs may be under-sampled, averaged and then grouped. Each group may be represented by a QB-Code. After starting 61 the training mode, the present invention may create a conventional atlas 60, such as is known in the prior art. The present invention may then group the similar samples 62, for example, by using similarity measures such as cross-correlation and clustering techniques. Such techniques may include k-means and/or fuzzy c-means. One embodiment of the present invention may generate a representative sample for each group 64. Also, a QB-Code may be generated for each group 66 and this QB-Code may represent a group of similar grey level images. The system or method may query whether a QB-Code has been generated for each group 67 and may repeat the step of generating 66 until a QB-Code is generated for each group, at which point the mode may end 68.

Figure 7:
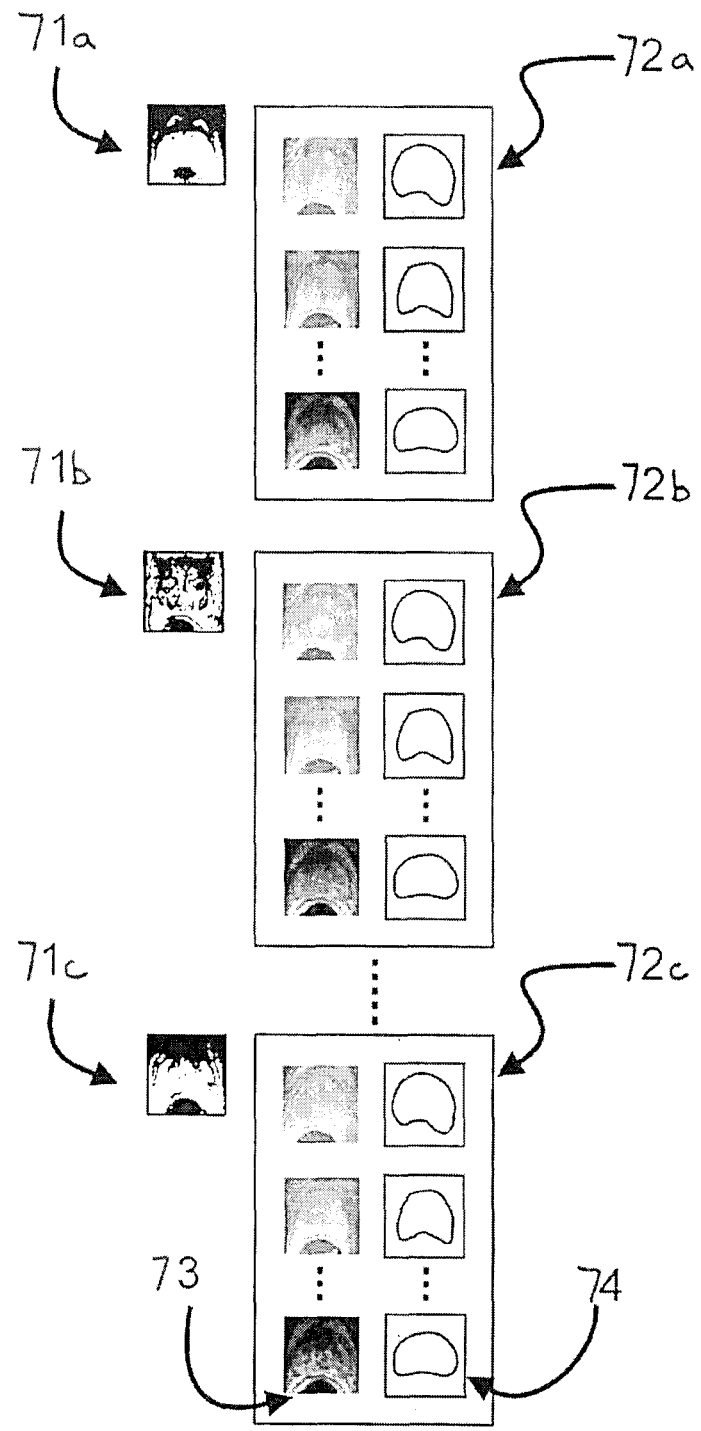
FIG. 7 shows an example of QBinary controlled atlas segmentation of an embodiment of the present invention.

The present invention may include segmentation of images, for example as an interactive mode, as shown in FIG. 7. One or more initial ROIs 71a, 71b, 71c may be utilized by the present invention. B-CAS may be applied so that each QB-Code may represent a group of similar thumbnails 73 each attached to a gold standard contour 74. The thumbnails and associated gold standard contours may represent one or more groups 72a, 72b, 72c. The present invention may generate a QB-Code for all images, for example, such as any new image. The present invention may search across all groups in the atlas to find the most similar QB-Code. For example, such searching may be undertaken by XOR-based, mutual information, or correlation-based similarity measures. The present invention may also search within the detected group to refine the search. For example, cross-correlation or other gray-level-based comparison measures may be applied. An associated gold standard contour may be determined and this may be applied by the present invention.

The QB-Codes stored in the atlas may be transformed via any image registration algorithm or calculation to better match the new image's QB-Code. The gold standard contour that is determined as a result of the search may be utilized by the present invention. In one embodiment of the present invention the contour may be registered.

Fast Slice-by-Slice Auto-Contouring of Volume Data (SbS ACV)

Figure 8:
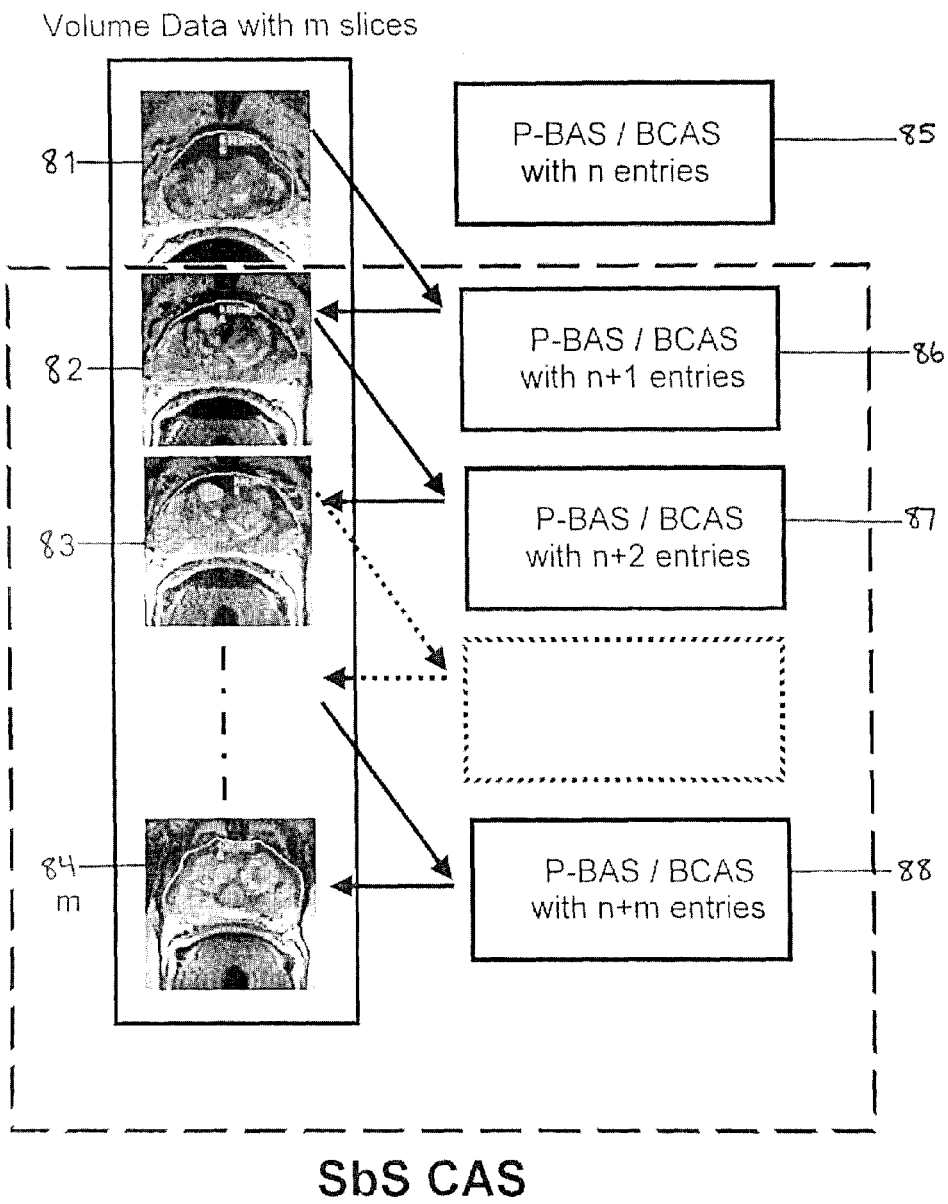
FIG. 8 shows an example of Fast Slice-by-Slice Auto-Contouring of Volume Data (SbS ACV) of an embodiment of the present invention.

Embodiments of the present invention may offer a set of algorithms to sequentially auto-contour (or auto-segment) individual slices of a volume set of digital images, provided one slice is semi-automatically contoured by a human operator. The present invention may utilize the QB-Codes and apply sequential edit propagation to achieve fast slice-by-slice auto-contouring of volume image data (SbS ACV). An example of an embodiment of the present invention that implements SbS ACV is shown in FIG. 8. The present invention may implement SbS ACV in the following manner.

The present invention may generate or receive a slice of an image or ROI 8-1. Said slice may be contoured semi-automatically or manually.

The following steps may be repeated until all images are processed: (1) The edited contour, or multiple contours, and the QB-Codes associated with the contours, may be inserted into the atlas. For example said atlas may be a QBinary atlas in P-BAS, or a QBinary-controlled atlas in B-CAS. (2) The present invention may automatically segment the next slice by propagating the ROI (or other user input), the QB-Code and the associated gold standard contour.

As shown in FIG. 8, these steps may involve the ROI 81 being processed by P-BAS or B-CAS with n entries 85. The processing by P-BAS or BCAS with n+1 entries 86 may produce n+1 entries 82. Further processing by P-BAS or BCAS with n+2 entries 87 may produce n+2 entries 83. Still further processing by P-BAS or BCAS with n+m entries 88 may produce n+m entries 84.

The sequential edit propagation of the present invention may have several outcomes and effects, for example such as the following: (i) auto-segmentation may occur without user intervention; (ii) fast real-time segmentation may result; and (iii) expansion of the existing atlas may occur and have the effect of increasing the accuracy for future applications to which the present invention is employed.

Figure 12:
FIG. 12 shows a table that provides results of the clinical validation for segmentation of prostate gland in magnetic resonance images using an embodiment of the present invention.

Certain clinical validations of the present invention have been achieved. FIG. 12 shows a table 120 presenting results for the application of the present invention employed for segmentation of prostate gland in magnetic resonance images.

It will be appreciated by those skilled in the art that other variations of the embodiments described herein may also be practiced without departing from the scope of the invention. Other modifications are therefore possible. For example, the present invention may be utilized for non-medical applications such as "image retrieval". By storing a QBinary code for each image (to create an atlas), new images, for example, such as unseen images, may be easily detected in a large database. Such a task that could be computationally very expensive for gray-level images and therefore the application of present invention to such a non-medical use provides benefits and advantages over the prior art.

We claim:

1. A method of QB-Code generation to efficiently use atlas-based segmentation using any of binary or quasi-binary representations of image regions of interest, or a combination of binary and quasi-binary representation of image regions of interest, comprising:
   a. identifying a region of interest (ROI) in an image;
   b. generating a QB-code for the ROI by searching to identify an applicable QB-Code in a binary atlas or a quasi-binary atlas; and
   c. determining a gold standard contour, wherein said gold standard contour is attached to the generated QB-Code.

2. The method of claim 1, wherein generating the QB-Code comprises one or more of:
   a. a pure binary atlas segmentation;
   b. a quasi-binary atlas segmentation;
   c. a binary controlled atlas segmentation; and
   d. a quasi-binary controlled atlas segmentation.

3. The method of claim 2, further comprising atlas segmentation with registration of the QB-Code.

4. The method of claim 1, further comprising utilizing the QB-Code and applying sequential edit propagation to achieve fast slice-by-slice auto-contouring of volume image data.

5. The method of claim 4, wherein achieving fast slice-by-slice auto-contouring of volume image data comprises:
   a. generating or receiving a slice of an ROI as a contoured ROI; and
   b. repeating the following steps until all images are processed:
      i. editing the contoured ROI and inserting the edited contoured ROI and the associated QB-code into the binary and/or quasi-binary atlas; and
      ii. automatically segmenting a next slice by propagating the contoured ROI and an associated gold standard contour.

6. The method of claim 5, further comprising one or more of:
   a. inserting the edited contoured ROI into a binary atlas;
   b. inserting the edited contoured ROI into a quasi-binary atlas;
   c. inserting the edited contoured ROI into a binary controlled atlas; and
   d. inserting the edited contoured ROI into a quasi-binary controlled atlas.

7. The method of claim 1, wherein generating the QB-Code comprises one or more of:
   a. thresholding the ROI;
   b. thresholding to transform the ROI;
   c. thresholding to segment the ROI;
   d. generating a local binary pattern involving the ROI; and
   e. generating a customized binary code involving the ROI.

8. The method of claim 1, wherein generating the QB-Code comprises one or more of:
   a. (multi-) thresholding the ROI;
   b. (multi-) thresholding to transform the ROI;
   c. (multi-) thresholding to segment the ROI;
   d. generating a local binary pattern involving the ROI; and
   e. generating a customized binary code involving the ROI.

9. The method of claim 1, further comprising:
   a. creating the binary atlas or quasi-binary atlas;
   b. grouping atlas entries;
   c. generating one or more representative samples for each group of atlas entries; and d. repeating the following steps until a QB-Code is generated for each of the one or more representative samples for each group:
   i. generating the QB-Code for each of the one or more representative samples for each group; and
   ii. querying whether the QB-Code is generated for each group.

10. The method of claim 1, further comprising creating the binary atlas or quasi-binary atlas to generate a pure QBinary atlas, or a QBinary controlled atlas.

11. The method of claim 1, further comprising utilizing an image registration algorithm for QB-Code generation.

12. The method of claim 1, further comprising registering the QB-Code.

13. A system of QB-Code generation to efficiently implement atlas-based segmentation using any of binary or quasi-binary representations of image regions of interest, or a combination of binary and quasi-binary representation of image regions of interest, comprising:
   a QB-Code Generator configured to (a) identify a region of interest (ROI) in an image and (b) generate a QB-code for the ROI by searching to identify an applicable QB-Code in a binary atlas or a quasi-binary atlas;
   wherein a gold standard contour attached to the generated QB-Code is determined.

14. The system of claim 13, wherein generating the QB-Code comprises one or more of:
   a. a pure binary atlas segmentation;
   b. a quasi-binary atlas segmentation;
   c. a binary controlled atlas segmentation; and
   d. a quasi-binary controlled atlas segmentation.

15. The system of claim 13, wherein generating the QB-Code comprises one or more of:
   a. thresholding the ROI;
   b. thresholding to transform the ROI;
   c. thresholding to segment the ROI;
   d. generating a local binary pattern involving the ROI; and
   e. generating a customized binary code involving the ROI.

16. The system of claim 13, wherein generating the QB-Code comprises one or more of:
   a. (multi-) thresholding the ROI;
   b. (multi-) thresholding to transform the ROI;
   c. (multi-) thresholding to segment the ROI;
   d. generating a local binary pattern involving the ROI; and
   e. generating a customized binary code involving the ROI.

* * * * *